US012602255B2

(12) United States Patent
Feng

(10) Patent No.: US 12,602,255 B2
(45) Date of Patent: Apr. 14, 2026

(54) TRANSACTION METHOD AND APPARATUS WITH FIXED EXECUTION ORDER

(71) Applicant: Digital Currency Institute, The People's Bank of China, Beijing (CN)

(72) Inventor: Kaikai Feng, Beijing (CN)

(73) Assignee: Digital Currency Institute, The People's Bank of China, Beijing (CN)

( * ) Notice: Subject to any disclaimer, the term of this patent is extended or adjusted under 35 U.S.C. 154(b) by 433 days.

(21) Appl. No.: 18/276,714

(22) PCT Filed: Feb. 10, 2022

(86) PCT No.: PCT/CN2022/075945
§ 371 (c)(1),
(2) Date: Aug. 10, 2023

(87) PCT Pub. No.: WO2022/171190
PCT Pub. Date: Aug. 18, 2022

(65) Prior Publication Data
US 2024/0118933 A1      Apr. 11, 2024

(30) Foreign Application Priority Data
Feb. 10, 2021      (CN) .......................... 202110185552.4

(51) Int. Cl.
*G06F 3/00*          (2006.01)
*G06F 9/50*          (2006.01)
(52) U.S. Cl.
CPC .... *G06F 9/5038* (2013.01); *G06F 2209/5011* (2013.01)

(58) Field of Classification Search
CPC ....................................................... G06F 9/50
See application file for complete search history.

(56) References Cited

U.S. PATENT DOCUMENTS

| | | | |
|---|---|---|---|
| 10,169,169 B1 * | 1/2019 | Shaikh | ................ G06F 11/2094 |
| 11,263,235 B2 * | 3/2022 | Hrle | .................... G06F 16/2379 |

(Continued)

FOREIGN PATENT DOCUMENTS

| | | | |
|---|---|---|---|
| CN | 101692737 A | * | 4/2010 |
| CN | 108830599 A | | 11/2018 |

(Continued)

OTHER PUBLICATIONS

Riccardo Guidotti, Clustering Individual Transactional Data for Masses of Users. (Year: 2017).*

(Continued)

*Primary Examiner* — Lechi Truong
(74) *Attorney, Agent, or Firm* — The Sun IP Law

(57)          ABSTRACT

Provided are a transaction method and apparatus with a fixed execution order, and relates to the technical field of computers. According to one alternative implementation, the method includes: transactions to be executed are received, generating an assembled transaction is generated with the transactions having a same identifier based on an assembly rule, and the assembled transaction to a transaction pool is sent; parsing, in response to acquiring a transaction from the transaction pool, the assembled transaction which is acquired to obtain a transaction list; and transaction execution is performed based on an execution order of each transaction in the transaction list.

14 Claims, 4 Drawing Sheets

(56) References Cited

U.S. PATENT DOCUMENTS

| | | | |
|---|---|---|---|
| 2007/0005560 A1* | 1/2007 | Dodge | G06F 11/1435 |
| 2016/0035026 A1 | 2/2016 | Chen | |
| 2019/0147471 A1* | 5/2019 | McKelvey, Jr. | G06Q 30/0255 |
| | | | 705/14.1 |
| 2020/0137082 A1* | 4/2020 | Jimenez-Delgado | |
| | | | H04L 9/0643 |
| 2020/0366463 A1 | 11/2020 | Falk | |
| 2022/0277027 A1* | 9/2022 | Arora | G06F 16/2379 |
| 2022/0358119 A1* | 11/2022 | Shao | G06F 16/2379 |
| 2022/0400020 A1* | 12/2022 | Davies | H04L 9/3255 |
| 2023/0259938 A1* | 8/2023 | Shi | H04L 9/50 |

FOREIGN PATENT DOCUMENTS

| | | | | | |
|---|---|---|---|---|---|
| CN | 109522098 A | * | 3/2019 | | G06F 9/466 |
| CN | 109598598 A | | 4/2019 | | |
| CN | 109684050 A | * | 4/2019 | | G06F 9/5061 |
| CN | 109995850 A | * | 7/2019 | | G06Q 40/04 |
| CN | 110033363 A | | 7/2019 | | |
| CN | 110648125 A | | 1/2020 | | |
| CN | 110689434 A | * | 1/2020 | | G06Q 20/42 |
| CN | 110796545 A | | 2/2020 | | |
| CN | 110827146 A | | 2/2020 | | |
| CN | 111325928 A | | 6/2020 | | |
| CN | 111709748 A | | 9/2020 | | |
| CN | 111858773 A | | 10/2020 | | |
| CN | 111861754 A | | 10/2020 | | |
| CN | 111882322 A | | 11/2020 | | |
| CN | 112837156 A | * | 5/2021 | | G06Q 20/389 |
| WO | 2020119298 A1 | | 6/2020 | | |
| WO | WO-2020177547 A1 | * | 9/2020 | | H04L 67/1059 |

OTHER PUBLICATIONS

The search report of counterpart EP application No. 22752350.3 issued on Dec. 11, 2024.
The search report of CN application No. 2021101855524 issue on Apr. 29, 2024.

* cited by examiner

Figure 2:
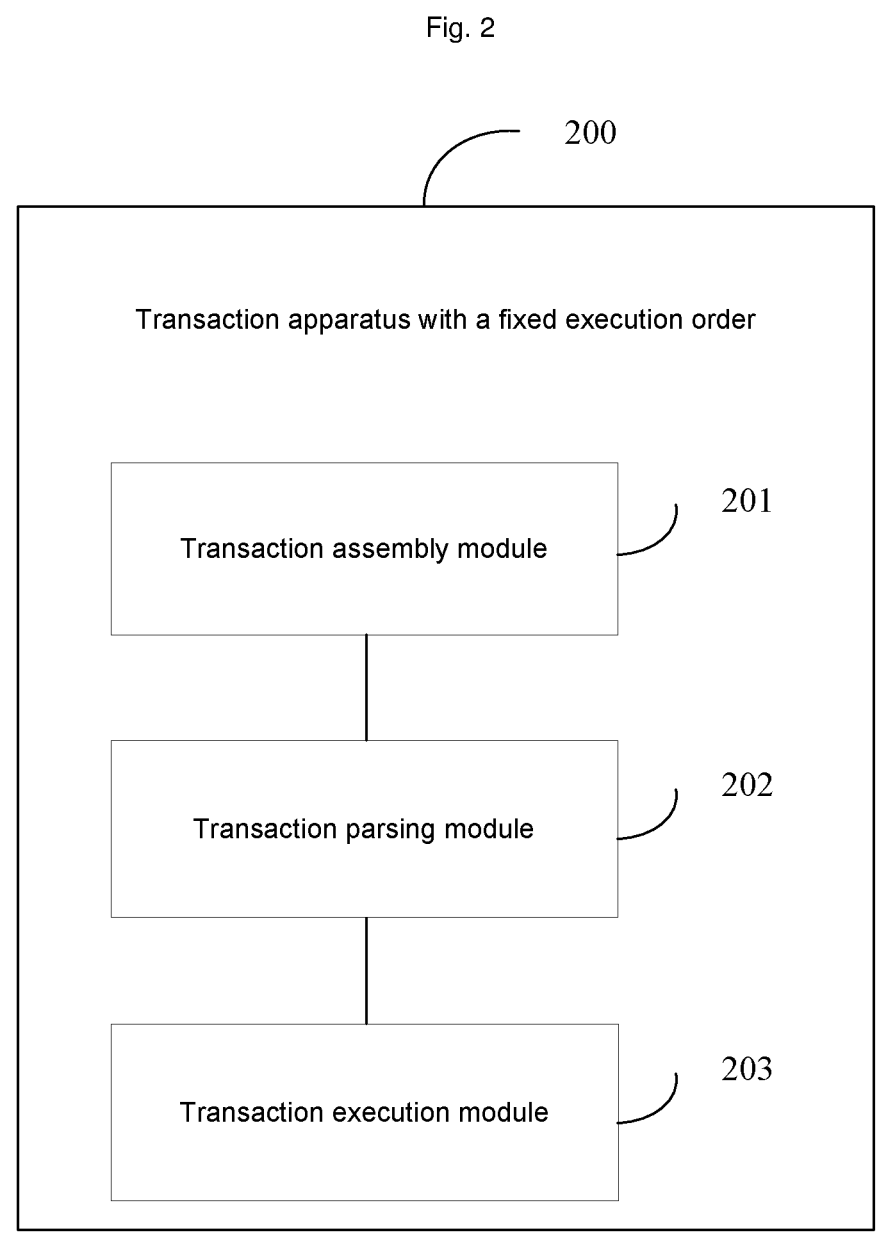

Transaction apparatus with a fixed execution order

Transaction assembly module    201

Transaction parsing module    202

Transaction execution module    203

300

303

302

301

304

305

TRANSACTION METHOD AND APPARATUS WITH FIXED EXECUTION ORDER

CROSS-REFERENCE TO RELATED APPLICATION

The present application claims the priority of the Chinese patent application filed on Feb. 10, 2021 with the application number of 202110185552.4 and the title of "Transaction Method and Apparatus with Fixed Execution Order", the entire contents of which are incorporated herein by reference for all or part of the present application.

TECHNICAL FIELD

The present disclosure relates to the technical field of computers, in particular to a transaction method and apparatus with a fixed execution order.

BACKGROUND

In a consortium blockchain, a transaction list (generally stored in a block structure) to be agreed upon for filling blocks is generally generated by selecting transactions from a transaction pool that stores transactions and adding the transactions to the list. The transactions in the transaction list are executed in the order in which they appear in the list. When transactions are selected from the transaction pool and placed into the transaction list, a filtering rule adopted may have a default implementation at an underlying layer of a system. Node operators may also modify the filtering rules, such as including first-in-first-out rules or formulating alternative rules in favor of its own.

During the implementation of the present disclosure, the inventors found at least the following problems in the relevant art:

The first-in-first-out rules may be affected by the network, and the rules formulated by the node operators may not be synchronized to all users at the first time. Therefore, the transaction senders or application users may not be sure that transaction lists they send may be executed in the fixed order they want. However, applications built on the blockchain generally require a fixed order of transaction execution due to business needs, i.e., the next transaction depends on execution results of last transaction or transactions. The common practice is to wait until the previous transaction or transactions receive a receipt, confirm completion of the execution and are uploaded to the chain before sending the next transaction, which may greatly affect the performance of business processing.

SUMMARY

In view of this, embodiments of the present disclosure provide a transaction method and apparatus with a fixed execution order. By means of the method and the apparatus, sorting and assembly may be performed on a transaction list without modifying an existing system, the form of an assembled transaction is adopted to ensure an execution order of a transaction list in the assembled transaction, and transaction execution with high processing performance is realized.

In order to realize the above object, according to one aspect of an embodiment of the present disclosure, a transaction method with a fixed execution is provided.

The transaction method with a fixed execution order includes: receiving transactions to be executed, generating an assembled transaction with the transactions having the same identifier based on an assembly rule, and sending the assembled transaction to a transaction pool; parsing, in response to acquiring a transaction from the transaction pool, the assembled transaction which is acquired to obtain a transaction list; and performing transaction execution based on an execution order of each transaction in the transaction list.

As at least one alternative embodiment, before the receiving transactions to be executed, further including: adding a reserved field for a transaction, the reserved field including a transaction identifier, a total number of transactions in a current batch, a transaction serial number of the transaction in the current batch, and a transaction serial number of a subsequent transaction.

As at least one alternative embodiment, the generating an assembled transaction with the transactions having a same identifier includes: acquiring a plurality of transactions having the same identifier based on the reserved field of the transaction, and sequencing the plurality of transactions based on the transaction serial number of the transaction in the current batch and the transaction serial number of the transaction after the transaction; judging the plurality of the acquired transactions based on the total number of the transactions in the current batch, and assembling, upon completion of receiving the transactions in the current batch, data of the plurality of the acquired transactions into a data part; and generating the assembled transaction by setting a transaction recipient of the data part to a set special address and adding an assembly identifier to the data part.

As at least one alternative embodiment, the generating an assembled transaction with the transactions having a same identifier includes: storing a transaction locally, and storing a mapping relationship between the transaction serial number or a hash signature of the transaction in the current batch and transaction data; acquiring a plurality of transactions having the same identifier based on the reserved field of the transaction, and sequencing transaction serial numbers or hash signatures based on the transaction serial number of the transaction in the current batch and a transaction serial number of a subsequent transaction; judging the plurality of the acquired transactions based on the total number of the transactions in the current batch, and assembling, upon completion of receiving the transactions in the current batch, the transaction serial numbers or the hash signatures of the plurality of the acquired transactions in the current batch into a data part; and generating the assembled transaction by setting a transaction recipient of the data part to a set special address and adding an assembly identifier to the data part.

As at least one alternative embodiment, before the parsing the assembled transaction which is acquired to obtain a transaction list, further including: judging, by means of a hook function, a transaction recipient of a transaction acquired from the transaction pool; acquiring, in a case that the transaction recipient is a predefined special address, an identifier of the transaction; and determining, in a case that the identifier of the transaction is an assembly identifier, that the transaction acquired from the transaction pool is the assembled transaction.

As at least one alternative embodiment, the parsing the assembled transaction which is acquired to obtain a transaction list includes: parsing the assembled transaction which is acquired based on the assembly rule to obtain the transaction list corresponding to the assembled transaction; or parsing the assembled transaction which is acquired based on the assembly rule to obtain a transaction serial number list or a hash signature list corresponding to the assembled transaction, and obtaining the transaction list corresponding to the assembled transaction based on the transaction serial number list or the hash signature list.

As at least one alternative embodiment, before the generating an assembled transaction with the transactions having a same identifier, further including: verifying validity of the received transactions by checking signatures of the received transactions.

According to another aspect of an embodiment of the present disclosure, a transaction method with a fixed execution order is provided.

The transaction apparatus with a fixed execution order includes: a transaction assembly module, configured to receive transactions to be executed, generate an assembled transaction with the transactions having a same identifier based on an assembly rule, and send the assembled transaction to a transaction pool; a transaction parsing module, configured to parse, in response to acquiring a transaction from the transaction pool, the assembled transaction which is acquired to obtain a transaction list; and a transaction execution module, configured to perform transaction execution based on an execution order of each transaction in the transaction list.

As at least one alternative embodiment, the transaction method with a fixed execution order further includes a field adding module configured to: add a reserved field for a transaction before the transaction to be executed is received, the reserved field including a transaction identifier, a total number of transactions in a current batch, a transaction serial number of the transaction in the current batch, and a transaction serial number of a subsequent transaction.

As at least one alternative embodiment, the transaction assembly module is further configured to: acquire a plurality of transactions having the same identifier based on the reserved field of the transaction, and sequencing the plurality of transactions based on the transaction serial number of the transaction in the current batch and the transaction serial number of the transaction after the transaction; judge the plurality of the acquired transactions based on the total number of the transactions in the current batch, and assemble, upon completion of receiving the transactions in the current batch, data of the plurality of the acquired transactions into a data part; and generate the assembled transaction by setting a transaction recipient of the data part to a set special address, and add an assembly identifier to the data part.

As at least one alternative embodiment, the transaction assembly module is further configured to: store a transaction locally, and save a mapping relationship between the transaction serial number or a hash signature of the transaction in the current batch and transaction data; acquire a plurality of transactions having the same identifier based on the reserved field of the transaction, and sequence transaction serial numbers or hash signatures based on the transaction serial number of the transaction in the current batch and a transaction serial number of the transaction after the transaction; judge the plurality of the acquired transactions based on the total number of the transactions in the current batch, and assemble, upon completion of receiving the transactions in the current batch, the transaction serial numbers or the hash signatures of the plurality of the acquired transactions in the current batch into a data part; and generate the assembled transaction by setting a transaction recipient of the data part to a set special address, and adding an assembly identifier to the data part.

As at least one alternative embodiment, the transaction method with a fixed execution order further includes a transaction determining module configured to: before parsing the assembled transaction which is acquired to obtain the transaction list, judge, by means of a hook function, a transaction recipient of a transaction acquired from the transaction pool; acquire, in a case that the transaction recipient is a predefined special address, an identifier of the transaction; and determine, in a case that the identifier of the transaction is an assembly identifier, that the transaction acquired from the transaction pool is the assembled transaction.

As at least one alternative embodiment, the transaction parsing module is further configured to: parse the assembled transaction which is acquired based on the assembly rule to obtain the transaction list corresponding to the assembled transaction; or parse the assembled transaction which is acquired based on the assembly rule to obtain a transaction serial number list or a hash signature list corresponding to the assembled transaction, and obtain the transaction list corresponding to the assembled transaction based on the transaction serial number list or the hash signature list.

As at least one alternative embodiment, the transaction method with a fixed execution order further includes a transaction verifying module configured to: verify, before generating the assembled transaction with the transactions having the same identifier, validity of the received transactions by checking signatures of the received transactions.

According to still another aspect of an embodiment of the present disclosure, a transaction electronic device with a fixed execution order is provided.

The transaction electronic device with the fixed execution order includes: one or more processors; and a storage apparatus, configured to store one or more programs. The one or more programs, when executed by the one or more processors, cause the one or more processors to implement the transaction method with a fixed execution order according to the embodiment of the present disclosure.

According to yet another aspect of an embodiment of the present disclosure, a computer-readable medium is provided.

The computer-readable medium has a computer program stored thereon, and the program, when executed by a processor, implements the transaction method with a fixed execution order according to the embodiment of the present disclosure.

An embodiment of the present disclosure has the following advantages or beneficial effects: by receiving the transactions to be executed, generating the assembled transaction with the transactions having the same identifier based on the assembly rule, and sending the assembled transaction to the transaction pool; parsing, in response to acquiring a transaction from the transaction pool, the acquired assembled transaction which is acquired to obtain the transaction list; and performing transaction execution based on the execution order of each transaction in the transaction list, sorting and assembly can be performed on the transaction list without modifying an existing system, the form of the assembled transaction is adopted to ensure the execution order of the transaction list in the assembled transaction, and transaction execution with high processing performance is realized.

Further effects of the above-mentioned non-conventional alternatives will be described below in connection with the detailed description.

BRIEF DESCRIPTION OF THE DRAWINGS

The drawings are included to provide a better understanding of the present disclosure and are not to be construed as unduly limiting the present disclosure.

FIG. 2 is a schematic diagram of main modules of a transaction method with a fixed execution order according to an embodiment of the present disclosure;

DETAILED DESCRIPTION OF THE EMBODIMENTS

Exemplary embodiments of the present disclosure will be described below with reference to the accompanying drawings, where the various details of the embodiments of the present disclosure are set forth to aid in understanding, which are to be considered exemplary only. Accordingly, a person of ordinary skill in the art will recognize that various changes and modifications may be made to the embodiments described herein without departing from the scope and spirit of the present disclosure. Similarly, for clarity and conciseness, the description of well-known functions and structures is omitted from the following description.

In order to solve the problems in the relevant art, the present disclosure provides a transaction method and apparatus with a fixed execution order, which may be used as a decentralized pluggable plug-in service at an underlying layer of a consortium blockchain, and may also be used as a centralized independent service to provide a fixed transaction rule service for the consortium blockchain for rule-based assembly of transactions, thus providing a high-performance mechanism for executing transactions based on fixed rules by means of transaction hooks and multi-executor (for transaction execution) functions at the underlying layer of the consortium blockchain.

Figure 1:
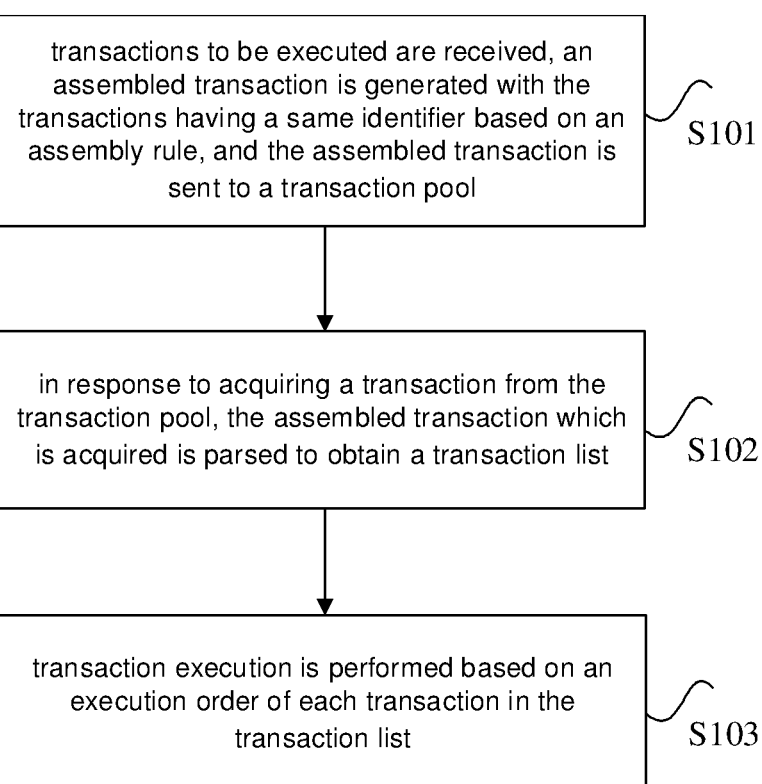
FIG. 1 is a schematic diagram of main steps of a transaction method with a fixed execution according to an embodiment of the present disclosure.

FIG. 1 is a schematic diagram of main steps of a transaction method with a fixed execution according to an embodiment of the present disclosure. As shown in FIG. 1, the transaction method with a fixed execution order according to the embodiment of the present disclosure mainly includes the following steps S101 to S103.

Step S101: transactions to be executed are received, an assembled transaction is generated with the transactions having a same identifier based on an assembly rule, and the assembled transaction is sent to a transaction pool.

Step S102: in response to acquiring a transaction from the transaction pool, the assembled transaction which is acquired is parsed to obtain a transaction list.

Step S103: transaction execution is performed based on an execution order of each transaction in the transaction list.

According to one embodiment of the present disclosure, a reserved field may be added for a transaction before the transaction to be executed is received. The reserved field includes a transaction identifier, a total number of transactions in a current batch, a transaction serial number of the transaction in the current batch, and a transaction serial number of a subsequent transaction.

To implement the technical solution of the present disclosure, when constructing transactions that need to be executed based on fixed rules, a user adds reserved fields for a transaction data, including: UUID (the transaction identifier), Length (the total number of transactions in the current batch), Num (the transaction serial number of the transaction in the current batch) and an [Nums] array (a transaction serial number list after the transaction) of subsequent transactions, and then sends the transactions to the fixed transaction order service based on the process, such that the transactions are executed in the predetermined order. Table 1 shows the details of the reserved fields.

TABLE 1

| Reserved field | UUID | Length | Num | Nums |
|---|---|---|---|---|
| Length Description | 1 byte Indicating the batch of transactions in a fixed order | 1 byte Indicating the total number of transactions in the current batch | 1 byte Indicating the serial number of the transaction in the current batch | Lengthened A stored transaction list |

The transaction serial number list after the transaction is stored in the [Nums] array. The transaction serial number list may include one transaction serial number or a plurality of transaction serial numbers. When the transaction serial number list includes one transaction serial number, it means that the transaction and the transaction serial number of the transaction after the transaction are executed serially. When the transaction serial number list includes the plurality of transaction serial numbers, it means that the plurality of transaction serial number of the transaction after the transaction are executed in parallel and the transaction and the transaction serial number of the transaction after the transaction are executed serially. Based on the [Nums] array, the execution order for the transactions in the current batch may be set according to the needs of users. The transactions may be executed serially, or in parallel, or both serially and in parallel, or cyclically, and so on.

According to one embodiment of the present disclosure, the assembled transaction is generated with the transactions having the same identifier may be performed alternatively by the following steps:

a plurality of transactions having the same identifier based are acquired on the reserved field of the transaction, and the plurality of transactions are sequenced based on the transaction serial number of the transaction in the current batch and the transaction serial number to be executed after the transaction;

the plurality of the acquired transactions are judged based on the total number of the transactions in the current batch, and assemble, upon completion of receiving the transactions in the current batch, data of the plurality of the acquired transactions into a data part; and the assembled transaction is generated by setting a transaction recipient of the data part to a set special address, and an assembly identifier is added to the data part.

In the alternative implementation, taking the decentralized fixed transaction order service (hereinafter referred to as the "service") as an example, when the service receives transactions, the service may assemble the transactions by the following method:

1. The received data is determined based on the reserved fields of the received transaction data, and a group of transaction data with the same transaction identifier UUID is assembled into a data part of a transaction based on the rule.

2. The received data is determined based on the reserved fields of the received transaction data, whether all the transactions included in the batch with the same UUID have been received is determined, if so, the transactions with the current UUID are assembled.

3. A to field (a transaction recipient) of the assembled transaction is set to a preset fixed special address.

4. In order to avoid possible conflicts of the special address, a preset special identifier field is added to the header of the data part of the assembled transaction, and a combination of "special address+special identifier" is taken as an identifier of the assembled transaction, i.e., the assembly identifier.

5. The transactions after assembly are signed to obtain the assembled transaction.

According to another embodiment of the present disclosure, the assembled transaction with the transactions having the same identifier is generated may be performed alternatively by the following steps:

a transaction is stored locally, and a mapping relationship between the transaction serial number or a hash signature of the transaction in the current batch and transaction data is stored;

a plurality of transactions having the same identifier are acquired based on the reserved field of the transaction, and transaction serial numbers or hash signatures are sequenced based on the transaction serial number of the transaction in the current batch and a transaction serial number of a transaction after the transaction; and the plurality of the acquired transactions are judged based on the total number of the transactions in the current batch, and assemble, upon completion of receiving the transactions in the current batch, the transaction serial numbers or the hash signatures of the plurality of the acquired transactions in the current batch into a data part; and the assembled transaction by setting a transaction recipient of the data part to a set special address is generated, and an assembly identifier to the data part is added.

In the alternative implementation, taking the centralized fixed transaction order service (hereinafter referred to as the "service") as an example, upon receiving the transactions, the service may assemble the transactions by the following method:

1. The received transactions are stored locally, and mapping of the transaction serial numbers or hash signatures of the transactions to alternative transaction data and mapping of the transactions to the transaction serial number list or a hash signature list after the transactions are stored.

2. The received data is determined based on the reserved fields of the received transaction data, whether all the transactions included in the batch with the same UUID have been received is determined, if so, the transactions with the current UUID are assembled. Alternatively, the transaction serial numbers or the hash signatures of the transactions are assembled.

3. A to field (a transaction recipient) is set to a preset fixed special address.

4. In order to avoid possible conflicts of special addresses, a preset special identifier field is added to the header of the data part, and a combination of "special address+special identifier" is taken as an identifier, i.e., the assembly identifier.

5. The transactions after assembly are signed to obtain the assembled transaction.

After the transactions requiring the fixed execution order are assembled into the assembled transaction, the assembled transaction may be sent to the transaction pool. In addition, after a transaction is acquired from the transaction pool, whether the transaction needs to be executed in the fixed order is determined by determining whether the transaction is the assembled transaction.

According to another embodiment of the present disclosure, before parsing the assembled transaction which is acquired to obtain the transaction list, whether the transaction acquired from the transaction pool is the assembled transaction needs to be determined alternatively by the following steps:

a transaction recipient of a transaction acquired from the transaction pool is judged by means of a hook function;

in a case that the transaction recipient is a predefined special address, an identifier of the transaction is acquired; and in a case that the identifier of the transaction is an assembly identifier, that the transaction acquired from the transaction pool is an assembled transaction is determined.

In the embodiment of the present disclosure, the corresponding logic may be executed by pre-registering the hook function. The hook function is part of a message processing mechanism. By setting a hook, an application may filter all messages and events at the system level and access messages that are not accessible under normal circumstances. The hook is essentially a program that handles system messages, and is hooked into the system through a system call.

The registered transaction hook function may be triggered when the transaction is executed. The hook function pulls the transaction and determines the 'to field' (i.e., the transaction recipient) of the transaction. When the transaction recipient is the special address predefined by the service, a header field of the transaction content is read. When the header field meets the special identifier (i.e., the assembly identifier) defined by the service, it is judged that the pulled transaction is an assembled transaction. The hook sends the assembled transaction to the service for parsing.

According to yet another embodiment of the present disclosure, parse the assembled transaction which is acquired to obtain the transaction list alternatively includes: the assembled transaction which is acquired based on the assembly rule is parsed to obtain the transaction list corresponding to the assembled transaction; or parse the assembled transaction which is acquired based on the assembly rule is parsed to obtain a transaction serial number list or a hash signature list corresponding to the assembled transaction, and the transaction list corresponding to the assembled transaction based on the transaction serial number list or the hash signature list is obtained. The service performs parsing based on the contents of the reserved fields as shown in Table 1 as well as the assembly rules, so as to restore an original transaction list and return a original transaction list to the hook function.

The hook function receives the original transaction list and returns the original transaction list. The original transaction list continues to be executed at a registered position of the hook function. In this case, each transaction is independent, and other transactions are not affected by execution failure of a single transaction. When a transaction fails to be executed, transaction rollback may be executed based on a set rule. When the set rule is no rollback, the rollback operation of the executed transaction is not needed; when the set rule is to roll back the current transaction failed to be executed, the current transaction failed to be executed is rolled back; when the set rule is to roll back the entire assembled transaction, all executed transactions are rolled back. The alternative implementation logics may be included in the hook function.

According to the technical solution of the present disclosure, before generating the assembled transaction with the transactions having the same identifier, the validity of the received transactions may also be verified by checking the signatures of the received transactions. At the same time, the integrity of the received transactions may also be verified.

According to one embodiment of the present disclosure, when the transaction method with a fixed execution order is implemented as the decentralized plug-in service, the process of performing transaction execution with the service is as follows:

1. Private keys are generated when the service is started, for subsequent signing of a transaction after assembly.
2. The transaction hook function is registered at an actuator hook point of an underlying layer. A plurality of hook points are provided at the underlying layer, and different positions registered with hook points may achieve different functions. For example, when registered at the actuator, rollback of a single transaction may be performed when the transaction fails to be executed; when registered at a virtual machine, rollback of the entire assembled transaction may be performed when the transaction fails to be executed.
3. The service receives the transactions in the fixed order and determines that the signatures pass verification, which indicates the validity of all the transactions.
4. The service assembles a transaction list with the same identifier into one transaction based on the rule.
5. The service signs the transaction after assembly and sends the transaction to the transaction pool.
6. The transaction hook is triggered during transaction execution and determines whether the transaction is an assembled transaction, if so, the assembled transaction is sent to the service.
7. The transaction hook receives the parsed original transaction list from the service and returns the original transaction list to the hook point, such that the original transaction list may be executed in the fixed order.

According to another embodiment of the present disclosure, when the transaction method with a fixed execution order is implemented as the centralized independent service, the process of performing transaction execution with the service is as follows:

1. The service is deployed independently, and private keys are generated when the service is started, for subsequent signing of a transaction after assembly.
2. The transaction hook function is registered at an actuator hook point of an underlying layer. A plurality of hook points are provided at the underlying layer, and different positions registered with hook points may achieve different functions. For example, when registered at the actuator, rollback of a single transaction may be performed when the transaction fails to be executed; when registered at a virtual machine, rollback of the entire assembled transaction may be performed when the transaction fails to be executed.
3. The service receives the transactions in the fixed order and determines that the signatures pass verification, which indicates the validity of all the transactions.
4. The service assemblies the transaction serial number list or the hash signature list of the transactions having the same identifier into one transaction based on the rule, and stores the data content of the transaction locally.
5. The service signs the transaction after assembly and sends the transaction to the transaction pool.
6. The transaction hook is triggered during transaction execution and determines whether the transaction is an assembled transaction, if so, the assembled transaction is sent to the service.
7. The transaction hook receives the parsed transaction serial number list or a hash signature list of original transactions from the service.
8. The transaction hook accesses the service based on the transaction serial number list or the hash signature list to obtain the original transaction list, and returns the original transaction list to the hook point, such that the original transaction list may be executed in the fixed order.

FIG. 2 is a schematic diagram of main modules of a transaction apparatus with a fixed execution order according to an embodiment of the present disclosure. As shown in FIG. 2, the transaction apparatus 200 with the fixed execution order according to the embodiment of the present disclosure mainly includes a transaction assembly module 201, a transaction parsing module 202, and a transaction execution module 203.

The transaction assembly module 201 is configured to receive transactions to be executed, generate an assembled transaction with the transactions having a same identifier based on an assembly rule, and send the assembled transaction to a transaction pool.

The transaction parsing module 202 is configured to parse, in response to acquiring a transaction from the transaction pool, the assembled transaction which is acquired to obtain a transaction list.

The transaction execution module 203 is configured to perform transaction execution based on an execution order of each transaction in the transaction list.

According to one embodiment of the present disclosure, the transaction apparatus 200 with the fixed execution order may further include a field adding module (not shown in the figure) configured to:

a reserved field for a transaction is added before the transaction to be executed is received. The reserved field includes a transaction identifier, a total number of transactions in a current batch, a transaction serial number of the transaction in the current batch, and a transaction serial number of a subsequent transaction.

According to one embodiment of the present disclosure, the transaction assembly module 201 may be further configured to:

a plurality of transactions having the same identifier are acquired based on the reserved field of the transaction, and the plurality of transactions are sequenced based on the transaction serial number of the transaction in the current batch and the transaction serial number of the transaction after the transaction;

the plurality of the acquired transactions are judged based on the total number of the transactions in the current batch, and assemble, upon completion of receiving the transactions in the current batch, data of the plurality of the acquired transactions into a data part; and the assembled transaction are generated by setting a transaction recipient of the data part to a set special address, and an assembly identifier to the data part is added.

According to another embodiment of the present disclosure, the transaction assembly module 201 may be further configured to:

a transaction is stored locally, and a mapping relationship is stored between the transaction serial number or a hash signature of the transaction in the current batch and transaction data;

a plurality of transactions having the same identifier are acquired based on the reserved field of the transaction, and transaction serial numbers or hash signatures are sequenced based on the transaction serial number of the transaction in the current batch and a transaction serial number of the transaction after the transaction; and the plurality of the acquired transactions are judged based on the total number of the transactions in the current batch, and assemble, upon completion of receiving the transactions in the current batch, the transaction serial numbers or the hash signatures of the plurality of the acquired transactions in the current batch into a data part; and the assembled transaction is generated by setting a transaction recipient of the data part to a set special address, and an assembly identifier to the data part is added.

According to yet another embodiment of the present disclosure, the transaction apparatus 200 with the fixed execution order may further include a transaction determining module (not shown in the figure) configured to:

before parsing the assembled transaction which is acquired to obtain the transaction list, a transaction recipient of a transaction acquired from the transaction pool is judged by means of a hook function;

in a case that the transaction recipient is a predefined special address, an identifier of the transaction is acquired; and in a case that the identifier of the transaction is an assembly identifier, that the transaction acquired from the transaction pool is the assembled transaction is determined.

According to yet another embodiment of the present disclosure, the transaction parsing module 202 may be further configured to:

the assembled transaction which is acquired is parsed based on the assembly rule to obtain the transaction list corresponding to the assembled transaction; or the assembled transaction which is acquired is parsed based on the assembly rule to obtain a transaction serial number list or a hash signature list corresponding to the assembled transaction, and the transaction list corresponding to the assembled transaction is obtained based on the transaction serial number list or the hash signature list.

According to yet another embodiment of the present disclosure, the transaction apparatus 200 with the fixed execution order may further include a transaction verifying module (not shown in the figure) configured to:

before generating the assembled transaction with the transactions having the same identifier, validity of the received transactions is verified by checking the signatures of the received transactions.

According to the technical solutions of the embodiments of the present disclosure, by receiving the transactions to be executed, generating the assembled transaction with the transactions having the same identifier based on the assembly rule, and sending the assembled transaction to the transaction pool; parsing, in response to acquiring a transaction from the transaction pool, the acquired assembled transaction to obtain the transaction list; and performing transaction execution based on the execution order of each transaction in the transaction list, sorting and assembly may be performed on the transaction list without modifying the existing system, the form of the assembled transaction is adopted to ensure the execution order of the transaction list in the assembled transaction, and transaction execution with high processing performance is realized.

Figure 3:
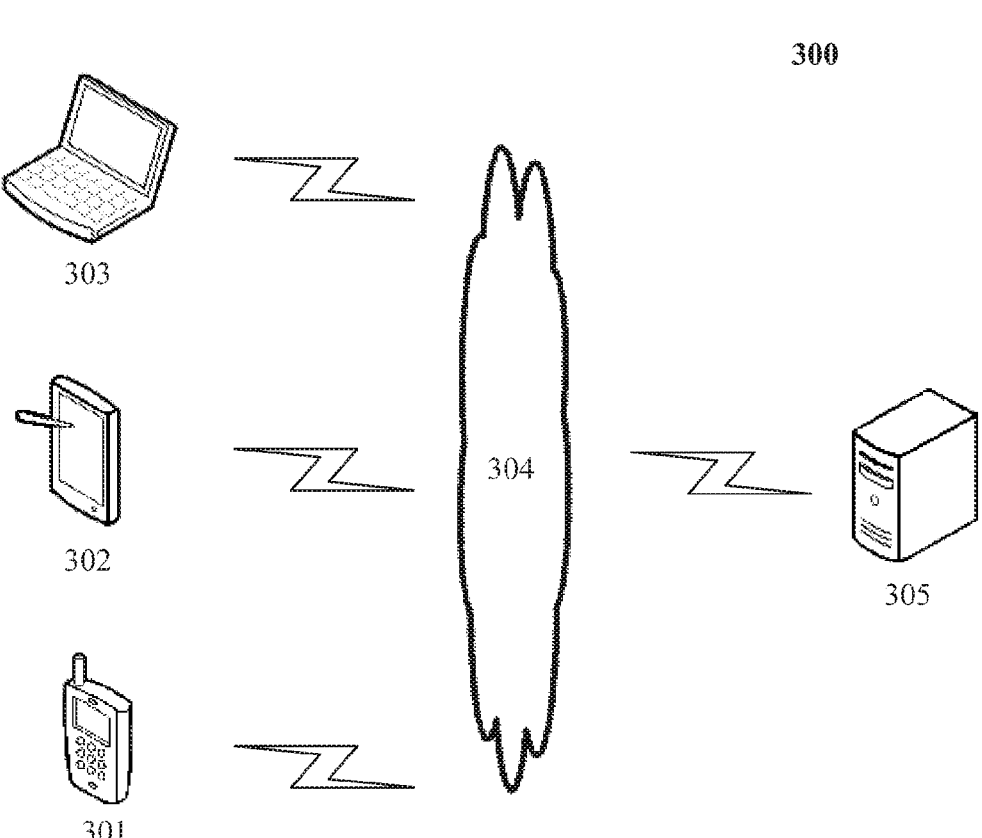
FIG. 3 is a diagram of an exemplary system architecture to which embodiments of the present disclosure may be applied.

FIG. 3 illustrates an exemplary system architecture 300 to which the transaction method with a fixed execution order or the transaction method with a fixed execution order according to the embodiment of the present disclosure may be applied.

As shown in FIG. 3, the system architecture 300 may include terminal devices 301, 302 and 303, a network 304, and a server 305. The network 304 is used for providing a medium for a communication link between the terminal devices 301, 302 and 303 and the server 305. The network 304 may include various connection types, such as wired communication links, wireless communication links, and fiber optic cables.

Users may use the terminal devices 301, 302 and 303 to interact with the server 305 via the network 304, so as to receive or send messages, etc. Various transaction applications, such as banking applications and other third-party transaction applications, may be installed on the terminal devices 301, 302 and 303.

The terminal devices 301, 302 and 303 may be various electronic devices that have displays and support web browsing, including but not limited to smart phones, tablets, laptops and desktop computers, etc. (only for illustration).

The server 305 may be a server that provides various services, such as a backend management server (only for illustration) that supports transaction execution requests sent by users via the terminal devices 301, 302 and 303. The backend management server may perform analysis and other processing on received data such as a request for in-order execution of transactions, and feed a processing result, such as a transaction processing result obtained after in-order execution of transactions (only for illustration) to the terminal devices.

It is to be noted that the transaction method with a fixed execution order according to the embodiment of the present disclosure is generally executed by the server 305, and accordingly, the transaction method with a fixed execution order is generally provided in the server 305.

It is to be understood that the numbers of the terminal devices, the network, and the server in FIG. 3 are merely schematic. Any number of terminal devices, networks, and servers may be provided as required by the implementation.

Figure 4:
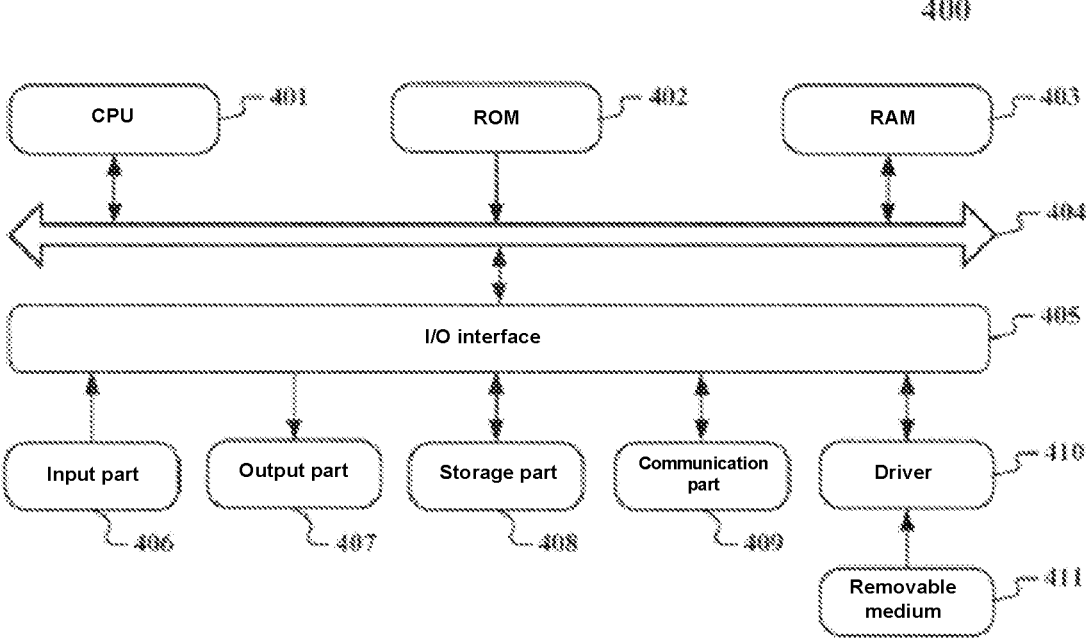
FIG. 4 is a schematic structural diagram of a computer system suitable for implementing a terminal device or server according to embodiments of the present disclosure.

Reference is made below to FIG. 4, which illustrates a schematic structural diagram of a computer system 400 suitable for implementing a terminal device or server according to the embodiments of the present disclosure. The terminal device or the server shown in FIG. 4 is only one example and should not be construed as limiting on the function and use range of the embodiment of the present disclosure.

As shown in FIG. 4, the computer system 400 includes a central processing unit (CPU) 401 that may perform various appropriate actions and processing based on programs stored in a read-only memory (ROM) 402 or programs loaded from a storage unit 408 into a random access memory (RAM) 403. Programs and data required for operations of the computer system 400 may be further stored in the RAM 403. The CPU 401, the ROM 402, and the RAM 403 are connected to each other through a bus 404. An input/output (I/O) interface 405 is also connected to the bus 404.

The following components are connected to the I/O interface 405: an input part 406 including a keyboard, a mouse, etc.; an output part 407 including a cathode ray tube (CRT), a liquid crystal display (LCD) and a speaker, etc.; a storage part 408 including a hard disk, etc.; and a communication part 409 including network interface cards such as an LAN card and a modem. The communication part 409 performs communication processing via a network such as the Internet. A driver 410 is also connected to the I/O interface 405 as needed. A removable medium 411, such as a disk, a compact disk, a magnetic disk and a semiconductor memory, is installed on the driver 410 as needed such that computer programs read therefrom are installed into the storage part 408 as needed.

In particular, according to the embodiments of the present disclosure, the process described above with reference to the flow diagrams may be implemented as computer software programs. For example, an embodiment of the present disclosure includes a computer program product which includes a computer program carried on a computer-readable medium. The computer program includes a program code for performing the method shown in the flow diagram. According to this embodiment, the computer program may be downloaded and installed from the network via the communication part 409, and/or installed from the removable medium 411. The computer program, when executed by the central processing unit (CPU) 401, performs the above functions as defined in the system according to the present disclosure.

It is to be noted that the computer-readable medium according to the present disclosure may be a computer-readable signal medium or a computer-readable storage medium or any combination of both of the above. The computer-readable storage medium may be, for example, but is not limited to, an electrical, magnetic, optical, electromagnetic, infrared, or semiconductor system, apparatus, or device, or any combination of the above. More alternative examples of the computer-readable storage medium may include, but are not limited to: electrical connection via one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic memory device, or any suitable combination of the above. According to the present disclosure, the computer-readable storage medium may be any tangible medium that includes or stores a program, and the program may be used by or in combination with an instruction execution system, apparatus, or device. According to the present disclosure, the computer-readable signal medium may include data signals propagated in a baseband or as part of a carrier wave, in which a computer-readable program code is carried. The propagated data signals may be in a variety of forms, including but not limited to electromagnetic signals, optical signals, or any suitable combination of the above. The computer-readable signal medium may also be any computer-readable medium other than the computer-readable storage medium, and the computer-readable medium may send, propagate, or transmit a program for use by or in conjunction with the instruction execution system, apparatus, or device. The program code included by the computer-readable medium may be transmitted via any suitable medium, including but not limited to: wireless, wired, fiber optic cables, RF, etc., or any suitable combination of the foregoing.

The flow diagrams and the block diagrams in the accompanying drawings illustrate possible implementations of the architecture, functionality, and operation of the system, the method, and the computer program product according to the embodiments of the present disclosure. In this regard, each block in the flow diagram or block diagram may represent a module, a program segment, or part of a code, the module, the program segment, or part of the code including one or more executable instructions for implementing specified logical functions. It is also to be noted that in some alternative implementations, the functions noted in the blocks may also occur out of the order noted in the accompanying drawings. For example, two blocks shown in succession may actually be executed in parallel substantially, and sometimes they may also be executed in an inverse orde, which depends upon the functionality involved. It is also to be noted that each block in the block diagrams or flow diagrams as well as a combination of blocks in the block diagrams or flow diagrams may be implemented using a special hardware-based system that executes specified functions or operations, or implemented using a combination of special hardware and computer instructions.

The units or modules described as involved in the embodiments of the present disclosure may be implemented by means of software, or by means of hardware. The units or modules described may also be provided in a processor and may be described, for example, as a processor including a transaction assembly module, a transaction parsing module, and a transaction execution module. The names of the units or modules do not in some cases constitute a limitation on the units or modules. For example, the transaction assembly module may also be described as "a module configured to receive transactions to be executed, generate an assembled transaction with the transactions with the same identifier based on an assembly rule, and send the assembled transaction to a transaction pool".

As another aspect, the present disclosure further provides a computer-readable medium, which may be included in the device described in the above embodiments, or be present separately and not fitted into the device. The computer-readable medium carries one or more programs which, when executed by the device, cause the device to include: receive transactions to be executed, generate an assembled transaction with the transactions having the same identifier based on an assembly rule, and send the assembled transaction to a transaction pool; parse, in response to acquiring a transaction from the transaction pool, the assembled transaction which is acquired to obtain a transaction list; and perform transaction execution based on an execution order of each transaction in the transaction list.

According to the technical solutions of the embodiments of the present disclosure, by receiving the transactions to be executed, generating the assembled transaction with the transactions having the same identifier based on the assembly rule, and sending the assembled transaction to the transaction pool; parsing, in response to acquiring a transaction from the transaction pool, the acquired assembled transaction to obtain the transaction list; and performing transaction execution based on the execution order of each transaction in the transaction list, sorting and assembly may be performed on the transaction list without modifying an existing system, the form of the assembled transaction is adopted to ensure the execution order of the transaction list in the assembled transaction, and transaction execution with high processing performance is realized.

The alternative implementations above are not to be construed as limiting the scope of the present disclosure. It will be apparent to a person skilled in the art that various modifications, combinations, sub-combinations, and substitutions may occur, depending upon design requirements and other factors. Accordingly, it is intended that the present disclosure cover the modifications, equivalents, and improvements falling within the spirit and scope of the present disclosure.

What is claimed is:

1. A transaction method with a fixed execution order, comprising:

receiving transactions to be executed, generating an assembled transaction with the transactions having a same identifier based on an assembly rule, and sending the assembled transaction to a transaction pool;

parsing, in response to acquiring a transaction from the transaction pool, the assembled transaction which is acquired to obtain a transaction list; and performing transaction execution based on an execution order of each transaction in the transaction list;

before the receiving transactions to be executed, further comprising:

adding a reserved field for a transaction, the reserved field comprising a transaction identifier, a total number of transactions in a current batch, a transaction serial number of the transaction in the current batch, and a transaction serial number of a subsequent transaction;

wherein the generating an assembled transaction with the transactions having a same identifier comprises:

acquiring a plurality of transactions having the same identifier based on the reserved field of the transaction, and sequencing the plurality of transactions based on the transaction serial number of the transaction in the current batch and the transaction serial number of the transaction after the transaction;

judging the plurality of the acquired transactions based on the total number of the transactions in the current batch, and assembling, upon completion of receiving the transactions in the current batch, data of the plurality of the acquired transactions into a data part; and generating the assembled transaction by setting a transaction recipient of the data part to a set special address and adding an assembly identifier to the data part.

2. The transaction method with the fixed execution order according to claim 1, wherein the generating an assembled transaction with the transactions having a same identifier comprises:

storing a transaction locally, and storing a mapping relationship between the transaction serial number or a hash signature of the transaction in the current batch and transaction data;

acquiring a plurality of transactions having the same identifier based on the reserved field of the transaction, and sequencing transaction serial numbers or hash signatures based on the transaction serial number of the transaction in the current batch and a transaction serial number of a subsequent transaction; and judging the plurality of the acquired transactions based on the total number of the transactions in the current batch, and assembling, upon completion of receiving the transactions in the current batch, the transaction serial numbers or the hash signatures of the plurality of the acquired transactions in the current batch into a data part; and generating the assembled transaction by setting a transaction recipient of the data part to a set special address and adding an assembly identifier to the data part.

3. The transaction method with the fixed execution order according to claim 1, before the parsing the assembled transaction which is acquired to obtain a transaction list, further comprising:

judging, by means of a hook function, a transaction recipient of a transaction acquired from the transaction pool;

acquiring, in a case that the transaction recipient is a predefined special address, an identifier of the transaction; and determining, in a case that the identifier of the transaction is an assembly identifier, that the transaction acquired from the transaction pool is the assembled transaction.

4. The transaction method with the fixed execution order according to claim 1, wherein the parsing an assembled transaction which is acquired to obtain a transaction list comprises:

parsing the assembled transaction which is acquired based on the assembly rule to obtain the transaction list corresponding to the assembled transaction; or parsing the assembled transaction which is acquired based on the assembly rule to obtain a transaction serial number list or a hash signature list corresponding to the assembled transaction, and obtaining the transaction list corresponding to the assembled transaction based on the transaction serial number list or the hash signature list.

5. The transaction method with the fixed execution order according to claim 1, before the generating an assembled transaction with the transactions having a same identifier, further comprising:

verifying the validity of the received transactions by checking signatures of the received transactions.

6. An electronic device comprising:

at least one processor; and a storage apparatus, configured to store one or more programs, wherein the one or more programs, when executed by the one or more processors, cause the one or more processors to implement following actions:

receiving transactions to be executed, generating an assembled transaction with the transactions having a same identifier based on an assembly rule, and sending the assembled transaction to a transaction pool;

parsing, in response to acquiring a transaction from the transaction pool, the assembled transaction which is acquired to obtain a transaction list; and performing transaction execution based on an execution order of each transaction in the transaction list;

before the receiving transactions to be executed, further comprising:

adding a reserved field for a transaction, the reserved field comprising a transaction identifier, a total number of transactions in a current batch, a transaction serial number of the transaction in the current batch, and a transaction serial number of a subsequent transaction;

wherein the generating an assembled transaction with the transactions having a same identifier comprises:

acquiring a plurality of transactions having the same identifier based on the reserved field of the transaction, and sequencing the plurality of transactions based on the transaction serial number of the transaction in the current batch and the transaction serial number of the transaction after the transaction;

judging the plurality of the acquired transactions based on the total number of the transactions in the current batch, and assembling, upon completion of receiving the transactions in the current batch, data of the plurality of the acquired transactions into a data part; and generating the assembled transaction by setting a transaction recipient of the data part to a set special address and adding an assembly identifier to the data part.

7. The electronic device as claimed in claim 6, before the parsing the assembled transaction which is acquired to obtain a transaction list, further comprising:

judging, by means of a hook function, a transaction recipient of a transaction acquired from the transaction pool;

acquiring, in a case that the transaction recipient is a predefined special address, an identifier of the transaction; and determining, in a case that the identifier of the transaction is an assembly identifier, that the transaction acquired from the transaction pool is the assembled transaction.

8. The electronic device as claimed in claim 6, wherein the parsing an assembled transaction which is acquired to obtain a transaction list comprises:

parsing the assembled transaction which is acquired based on the assembly rule to obtain the transaction list corresponding to the assembled transaction; or parsing the assembled transaction which is acquired based on the assembly rule to obtain a transaction serial number list or a hash signature list corresponding to the assembled transaction, and obtaining the transaction list corresponding to the assembled transaction based on the transaction serial number list or the hash signature list.

9. The electronic device as claimed in claim 6, before the generating an assembled transaction with the transactions having a same identifier, further comprising:

verifying validity of the received transactions by checking signatures of the received transactions.

10. A non-transitory computer-readable medium, wherein the computer-readable medium stores a program computer program, the program computer is executable by a processor, implements following actions:

receiving transactions to be executed, generating an assembled transaction with the transactions having a same identifier based on an assembly rule, and sending the assembled transaction to a transaction pool;

parsing, in response to acquiring a transaction from the transaction pool, the assembled transaction which is acquired to obtain a transaction list; and performing transaction execution based on an execution order of each transaction in the transaction list;

before the receiving transactions to be executed, further comprising:

adding a reserved field for a transaction, the reserved field comprising a transaction identifier, a total number of transactions in a current batch, a transaction serial number of the transaction in the current batch, and a transaction serial number of a subsequent transaction;

wherein the generating an assembled transaction with the transactions having a same identifier comprises:

acquiring a plurality of transactions having the same identifier based on the reserved field of the transaction, and sequencing the plurality of transactions based on the transaction serial number of the transaction in the current batch and the transaction serial number of the transaction after the transaction;

judging the plurality of the acquired transactions based on the total number of the transactions in the current batch, and assembling, upon completion of receiving the transactions in the current batch, data of the plurality of the acquired transactions into a data part; and generating the assembled transaction by setting a transaction recipient of the data part to a set special address and adding an assembly identifier to the data part.

11. The electronic device as claimed in claim 10, wherein the generating an assembled transaction with the transactions having a same identifier comprises:

storing a transaction locally, and storing a mapping relationship between the transaction serial number or a hash signature of the transaction in the current batch and transaction data;

acquiring a plurality of transactions having the same identifier based on the reserved field of the transaction, and sequencing transaction serial numbers or hash signatures based on the transaction serial number of the transaction in the current batch and a transaction serial number of a subsequent transaction; and judging the plurality of the acquired transactions based on the total number of the transactions in the current batch, and assembling, upon completion of receiving the transactions in the current batch, the transaction serial numbers or the hash signatures of the plurality of the acquired transactions in the current batch into a data part; and generating the assembled transaction by setting a transaction recipient of the data part to a set special address and adding an assembly identifier to the data part.

12. The non-transitory computer-readable medium as claimed in claim 10, wherein the generating an assembled transaction with the transactions having a same identifier comprises:

storing a transaction locally, and storing a mapping relationship between the transaction serial number or a hash signature of the transaction in the current batch and transaction data;

acquiring a plurality of transactions having the same identifier based on the reserved field of the transaction, and sequencing transaction serial numbers or hash signatures based on the transaction serial number of the transaction in the current batch and a transaction serial number of a subsequent transaction; and judging the plurality of the acquired transactions based on the total number of the transactions in the current batch, and assembling, upon completion of receiving the transactions in the current batch, the transaction serial numbers or the hash signatures of the plurality of the acquired transactions in the current batch into a data part; and generating the assembled transaction by setting a transaction recipient of the data part to a set special address and adding an assembly identifier to the data part.

13. The non-transitory computer-readable medium as claimed in claim 10, before the parsing the assembled transaction which is acquired to obtain a transaction list, further comprising:

judging, by means of a hook function, a transaction recipient of a transaction acquired from the transaction pool;

acquiring, in a case that the transaction recipient is a predefined special address, an identifier of the transaction; and determining, in a case that the identifier of the transaction is an assembly identifier, that the transaction acquired from the transaction pool is the assembled transaction.

14. The non-transitory computer-readable medium as claimed in claim 10, wherein the parsing an assembled transaction which is acquired to obtain a transaction list comprises:

parsing the assembled transaction which is acquired based on the assembly rule to obtain the transaction list corresponding to the assembled transaction; or parsing the assembled transaction which is acquired based on the assembly rule to obtain a transaction serial number list or a hash signature list corresponding to the assembled transaction, and obtaining the transaction list corresponding to the assembled transaction based on the transaction serial number list or the hash signature list.

\* \* \* \* \*